Oct. 11, 1949.　　　R. F. BROWNELL　　　2,484,151
DISTANCE MEASURING DEVICE
Filed March 12, 1948
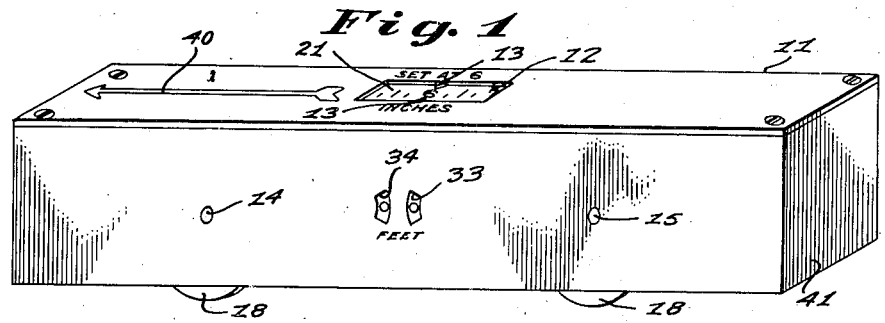
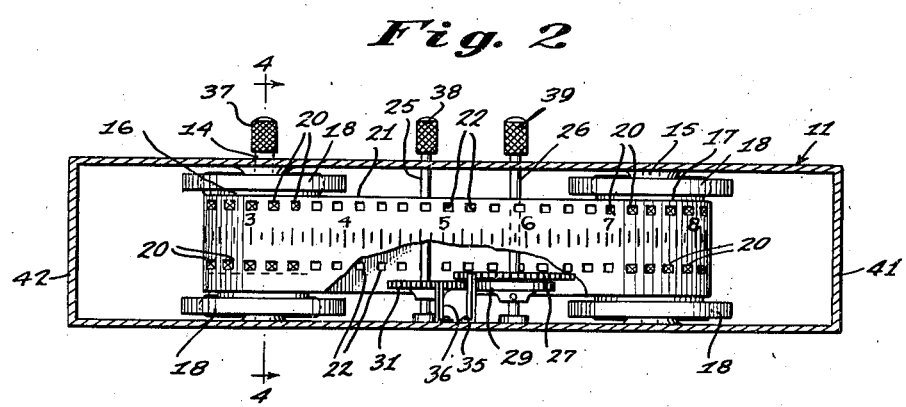
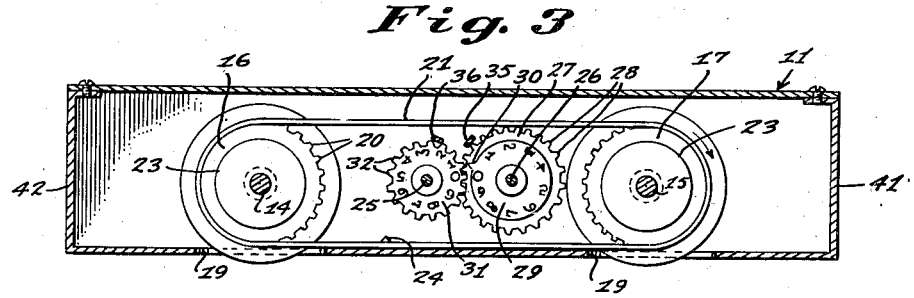
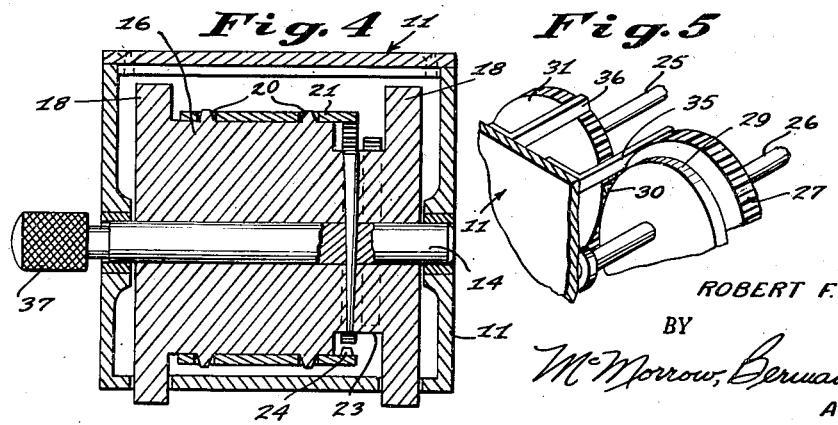
INVENTOR.
ROBERT F. BROWNELL
BY
McMorrow, Berman & Davidson
ATTORNEYS Patented Oct. 11, 1949

2,484,151

UNITED STATES PATENT OFFICE 2,484,151

DISTANCE MEASURING DEVICE

Robert F. Brownell, Theresa, N. Y.

Application March 12, 1948, Serial No. 14,417

1 Claim. (Cl. 33—141)

This invention relates to distance measuring devices, and more particularly to a distance measuring instrument of the friction wheel type.

A main object of the invention is to provide a novel and improved instrument for measuring straight distances wherein the measurement may be made by a single person with a minimum of time and labor and with high accuracy.

A further object of the invention is to provide an improved distance measuring instrument of the friction wheel type which is very simple in construction, easy to use and compact in size.

Further objects and advantages of the invention will become apparent from the following description and claim, and from the accompanying drawings, wherein:

Figure 1 is a perspective view of a measuring instrument constructed in accordance with the present invention.

Figure 2 is a horizontal cross-sectional view taken through the measuring instrument of Figure 1.

Figure 3 is a vertical longitudinal cross-sectional view of the instrument of Figure 1.

Figure 4 is an enlarged vertical transverse cross-sectional view taken on line 4—4 of Figure 2.

Figure 5 is a fragmentary perspective detail view showing the manner in which the tooth on the digit wheel engages the toothed "tens" wheel of the instrument at the end of a complete revolution of said digit wheel.

Referring to the drawings, 11 designates a housing, which by way of example, is shown as being rectangular, and which may have any desired length. For purposes of illustration of the operation of the invention, the housing herein is assumed to have a length of six inches. The top wall of the housing is formed at its central portion with a rectangular window 12 provided at the mid-points of its longitudinal edges with inwardly directed index pointers 13, 13.

Journaled in the side walls of housing 11 are transverse shafts 14 and 15 carrying the respective drums 16 and 17. Each drum is formed at its ends with enlarged wheel elements 18 which project below the bottom wall of the housing through longitudinal slots 19 formed therein. Each drum is formed with sprocket teeth 20 and engaged over the drums is a calibrated endless tape 21 of flexible metal or the like, formed with sprocket openings 22 receiving the sprocket teeth 20 of the drums. The drums are each reduced in diameter at one end, as shown at 23, 23 and the tape 21 overlaps these reduced drum portions. Said tape carries at the overlapping portion thereof an inwardly directed tooth 24. The tape is calibrated in inch units the units representing the linear distances traversed at the peripheries of the wheels 18 as said wheels roll over a surface, and the total length of the tape representing a traversed distance of twelve inches, the numerals thereon being from zero to eleven.

Journaled in the side walls of housing 11 between shafts 14 and 15 are transverse shafts 25 and 26. Shaft 26 carries a wheel 27 formed around its periphery with spaced teeth 28, said wheel being located in the longitudinal vertical plane of tooth 24 and being engageable at its upper portion by tooth 24 as the tooth travels to the left from drum 17, as viewed in Figure 3. Adjacent wheel 27, shaft 26 carries a wheel 29 formed with a single peripheral tooth 30. In the same vertical longitudinal plane as wheel 29, shaft 25 carries a wheel 31 formed around its periphery with spaced teeth 32 engageable by tooth 30 as said tooth moves counter-clockwise, as viewed in Figure 3, the aforesaid counter-clockwise movement of tooth 30 causing wheel 31 to rotate through one tenth of a revolution clockwise each time the tooth 30 moves past the wheel 31. Similarly each time the tooth 24 moves to the left past the top of wheel 27, said wheel is rotated one tenth of a revolution counter-clockwise.

Wheel 29 is marked with numerals zero to nine extending around its face and representing "feet" digits. Wheel 31 is similarly marked with numerals zero to nine representing "tens" of feet. The side wall of housing 11 adjacent wheels 29 and 31 is formed with adjacent respective windows 33 and 34 through which the numerals on the faces of said wheels may be viewed.

Secured to the housing side wall adjacent wheels 29 and 31 are resilient fingers 35 and 36. Finger 35 yieldably engages the toothed wheel 27 and holds it stationary until it is engaged by tooth 24. Similarly, finger 36 yieldably engages toothed wheel 31 and holds it stationary until it is engaged by the tooth 30.

Shafts 14, 25 and 26 are provided at their ends with respective knobs 37, 38 and 39 employed for setting the tape 21, wheel 31 and wheel 29 to starting positions when the instrument is to be used.

The top wall of housing 11 is marked with an arrow 40 indicating the direction in which the instrument is to be moved in making a measurement. In making a measurement, the rear end wall of housing 11 designated at 41, is aligned with the starting point and the instrument is moved along the distance to be measured until the front end wall designated at 42 is aligned with the terminal point of said distance. This requires that the instrument be initially set at a value corresponding to the length thereof in order to compensate for the length of housing 11. Figure 1 shows the instrument set in starting position, with the numeral "6" on tape 21 set between the pointers 13, 13, since the length of housing 11 in the illustrated embodiment herein described is six inches.

As the instrument is moved along its course, tape 21 travels around the drums 16 and 17, and each time a distance of one foot has been measured off tooth 24 moves wheel 29 through one tenth of a revolution. This moves a corresponding digit into view in window 33. At the end of every ten measured feet, tooth 30 moves wheel 31 through one tenth of a revolution, moving a corresponding "tens" numeral into view in window 34. At the end of a measurement the measured distance in feet and inches is read at windows 34, 33 and 12.

Wheels 31 and 29 are set at zero by means of the knobs 38 and 39 at the beginning of a measurement. By means of knob 37, tape 21 is set at the distance corresponding to the length of housing 11, as above explained.

While a specific embodiment of a distance measuring device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a measuring device, comprising a housing with side walls, a slotted bottom, and a top having an opening forming a viewing window, the improvement which includes two toothed drums spaced apart and journaled in the side walls of the housing, a pair of traction wheels fixed on the ends of each drum and projecting down through the slotted bottom of the housing to engage frictionally upon the surface to be measured and support said housing, a reduced end upon each drum within one traction wheel thereon along one side of the housing, a calibrated endless belt looped over both drums between the traction wheels in a position to be viewed through said viewing window and having a series of spaced openings within the edges thereof engaging with the teeth on said drums, a calibrated toothed wheel journaled in said side walls in said housing adjacent to the mentioned one side thereof between said drums and within the area surrounded by the endless belt with the periphery thereof adjacent to the inside of one portion of said endless belt, and an inwardly-projecting tooth fixed upon the inside of the latter belt at one side thereof in a position to clear the reduced ends of both drums and engage with the toothed wheel while moving past the same from one drum to the other in order to rotate said toothed wheel through a predetermined angle about its axis.

ROBERT F. BROWNELL.

REFERENCES CITED

The following references are of record in the file of this patent:

UNITED STATES PATENTS

| Number | Name | Date |
| --- | --- | --- |
| 788,914 | King | May 2, 1905 |
| 1,040,351 | King | Oct. 8, 1912 |
| 1,877,061 | Schroll | Sept. 13, 1932 |
| 2,033,970 | Anderson | Mar. 17, 1936 |
| 2,052,035 | Potter | Aug. 25, 1936 |
| 2,085,247 | Bible | June 29, 1937 |